United States Patent [19]
Gant et al.

[11] Patent Number: 4,868,742
[45] Date of Patent: Sep. 19, 1989

[54] INPUT/OUTPUT BUS FOR SYSTEM WHICH GENERATES A NEW HEADER PARCEL WHEN AN INTERRUPTED DATA BLOCK TRANSFER BETWEEN A COMPUTER AND PERIPHERALS IS RESUMED

[75] Inventors: Alan D. Gant; David A. Nobles, both of Garland; Thomas M. Jones; Arthur T. Kimmel, both of Dallas, all of Tex.

[73] Assignee: Convex Computer Corporation, Richardson, Tex.

[21] Appl. No.: 206,962

[22] Filed: Jun. 9, 1988

Related U.S. Application Data

[63] Continuation of Ser. No. 622,561, Jun. 20, 1984, abandoned.

[51] Int. Cl.$^4$ .................. G06F 13/20; G06F 13/42
[52] U.S. Cl. .................. 364/200; 264/230; 264/230.2; 264/242.6
[58] Field of Search .................. 364/200, 900

[56] References Cited
U.S. PATENT DOCUMENTS

| | | | |
|---|---|---|---|
| 4,096,572 | 6/1978 | Namimoto | 364/200 |
| 4,337,535 | 12/1980 | Wiedenman | 364/200 |
| 4,402,040 | 8/1983 | Evett | 364/200 |
| 4,445,176 | 4/1984 | Burk et al. | 364/200 |
| 4,471,457 | 9/1984 | Videki, II | 364/900 |
| 4,482,951 | 11/1984 | Swaney et al. | 364/200 |
| 4,482,954 | 11/1984 | Vrielink | 364/200 |
| 4,542,457 | 9/1985 | Mortensen | 364/200 |
| 4,543,627 | 9/1985 | Schwab | 364/200 |
| 4,611,275 | 9/1986 | Garnier | 364/200 |

OTHER PUBLICATIONS
Kuck, D. J., "The Structure of Computers and Computations", 1978, Chap. 6.

*Primary Examiner*—Archie E. Williams, Jr.
*Assistant Examiner*—Emily Y. Chan
*Attorney, Agent, or Firm*—Richards, Harris, Medlock & Andrews

[57] ABSTRACT

A communication bus (14) provides bidirectional data communication between a computer (12) and various peripheral units including input/output processors (18, 20) and a service processor (22). The computer includes a memory control unit (24) which is connected to a memory array (26). A central processor unit (30) is connected for data exchange with the memory control unit (24). Data blocks are transferred through the bus (14) and either originate or terminate at the memory array (26). A peripheral unit, such as the processor (18) transfers a data block by first transferring a header parcel (146) which defines an address, block length and type of function. This is transmitted to the memory control unit (24) which carries out the desired data transfer by sending or receiving sequential data parcels. An interrupt bus (16) connects each of the units of the computer system (10) including the processors (18, 20, 22) and the central processing unit (30). Any one of the units connected to the interrupt bus (16) can interrupt any of the other units. The interrupt process comprises sending an interrupt vector through interrupt lines (66). At the receiving unit the interrupt is identified and the appropriate function carried out. The combination of the communication bus and the interrupt bus (16) comprises an input/output bus for the computer system (10) to provide a high data bandwidth together with flexible operation.

7 Claims, 4 Drawing Sheets

INPUT/OUTPUT BUS FOR SYSTEM WHICH GENERATES A NEW HEADER PARCEL WHEN AN INTERRUPTED DATA BLOCK TRANSFER BETWEEN A COMPUTER AND PERIPHERALS IS RESUMED

This application is a continuation of application Ser. No. 622,561, filed 6/20/84 abandoned.

TECHNICAL FIELD

The present invention pertains in general to computer technology and in particular to a communication bus for providing data transfer between a computer and one or more peripheral units.

BACKGROUND ART

The central processor of a computer carries out the functions of data processing and operand manipulation. These functions can be designed to be carried out at an extremely fast rate. But to take advantage of the maximum execution rate of the processor, data must be delivered to the processor and returned from it at the rate required by the processor. Data can be received from numerous sources such as tape drives, disk drives and real time data. An input/output bus must be used to transmit the data to and from the central processor. Typically there are numerous types of devices that must be connected to an input/output bus. These numerous devices as well as the processor itself compete for the use of the bus.

Conventional input/output buses transfer an address together with each unit of data that is transmitted through the bus. Such a technique simplifies the interfacing to the bus and makes it easy to handle interruptions to the data transfer. However, this method of data transfer has a substantial overhead which seriously reduces the effective bandwidth of the data transfer through the bus. The limited bandwidth of a conventional bus can prevent the central processor from being used to its fullest capability.

In a further aspect of interconnecting the various elements of a computer system, there must be provided a means of communication for interrupts. Interrupt requests serve such functions as indicating completion of a task, requesting action or indicating an error condition. A conventional interrupt system has one element as the receiver and the remaining elements serving as transmitters of interrupts. The one receiver must provide all the necessary processing to carry out the requested functions of the other elements. This conventional interrupt configuration limits the flexibility of operations that can be carried out by the computer system and burdens the one receiving element with a substantial overhead penalty.

In view of the above considerations there exists a need for an input/output bus which provides a high bandwidth for data transfer by substantially reducing the overhead requirements of the transfer technique. There further exists a need for an interrupt system which can allow any of the elements of the system to provide an interrupt request to any of the other elements in the system without the need to route the interrupt through a central receiver.

SUMMARY OF THE INVENTION

A selected embodiment of the present invention is the method for data communication via a bus connecting a computer to one or more peripheral units. The peripheral units themselves may be processors. The method includes the steps of requesting to a bus arbiter use of the bus by one of the peripheral units. The bus arbiter grants use of the bus to the one peripheral unit in response to the requesting of the bus. A header parcel is generated which comprises an address for a data block to be transferred between the computer and the one peripheral unit, a count indicating the size of the data block and a command code indicating the type of transfer for the data block. The header parcel is transmitted from the one peripheral unit via the bus to the computer after the step of granting of the use of the bus. Sections of the data block are sequentially transmitted via the bus until all of the data block is transferred between the computer and the one peripheral unit. Thus only one address is transmitted for an entire block of data. However, if the data transfer is terminated before completion, a new header is generated and the data transfer is resumed. Therefore for large data blocks, the overhead is extremely small.

A further aspect of the present invention is a method for providing interrupts in a computer system which has a central processor unit and one or more peripheral units. The method includes the steps of requesting to a bus arbiter to use an interrupt bus by a first of the central processor unit or the peripheral units, the interrupt bus connected to each of the units. The bus arbiter grants use of the interrupt bus to the first unit, which requested use of the bus. A vector interrupt signal is transmitted from the first unit via the interrupt bus to a second of the central processor unit or peripheral units wherein the vector interrupt signal corresponds to the second unit. Finally, an acknowledgement of receipt of the vector interrupt signal is provided by the second unit to the first unit. By means of this interrupt system any one of the peripheral units or control unit can provide an interrupt to any one of the other units.

BRIEF DESCRIPTION OF THE DRAWINGS

For a more complete understanding of the present invention and the advantages thereof reference is now made to the following description taken in conjunction with the following drawings in which.

DESCRIPTION OF THE PREFERRED EMBODIMENT

The present invention is a method and circuit for providing data and interrupt communication between the various elements of a computer system. A primary objective of the system is to maximize the data bandwidth going into and out of the computer system.

Figure 1:
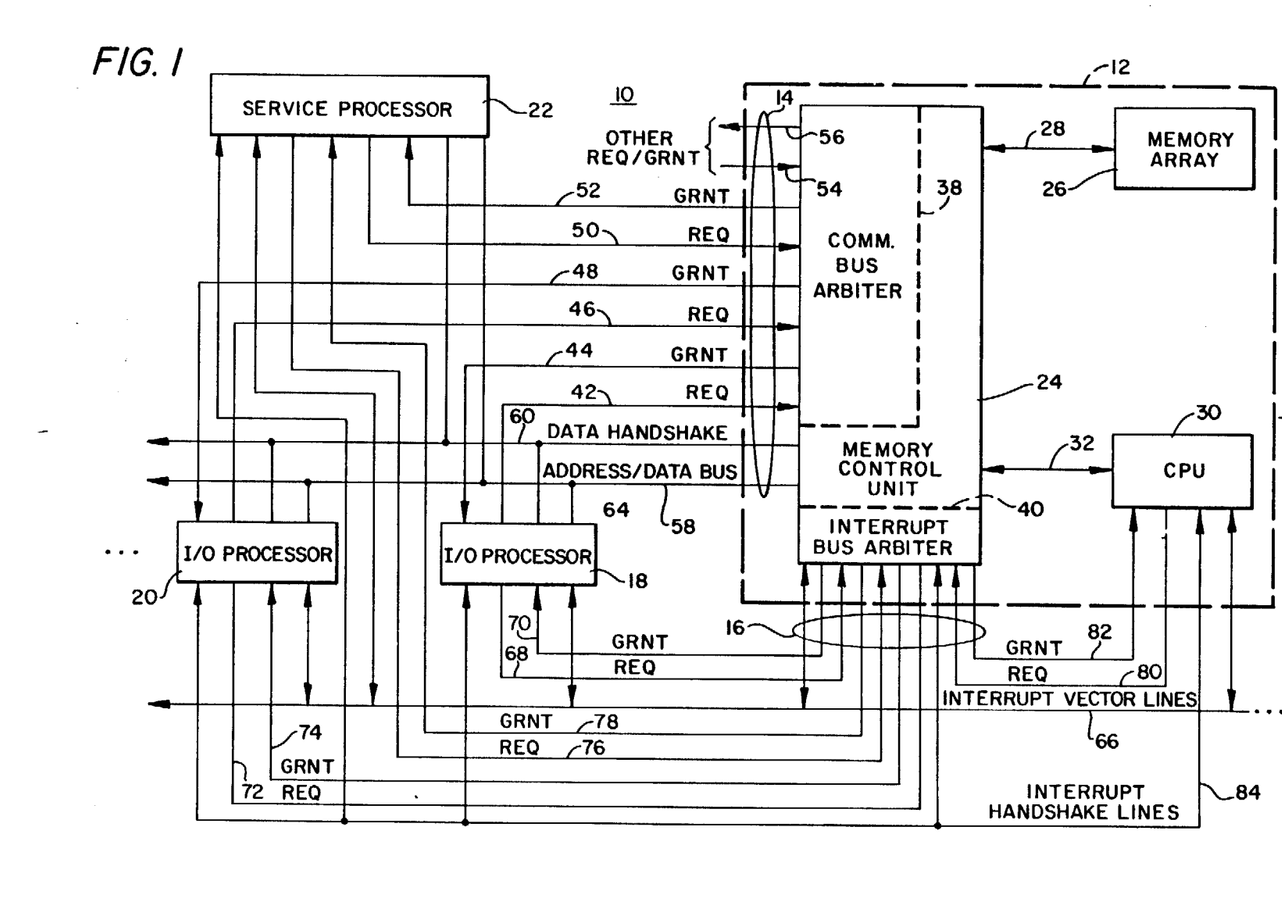
FIG. 1 is a functional block diagram of a computer system which includes a computer having a memory control unit, a memory array and a central processing unit, the computer communicating through an input/output bus to a plurality of peripheral units which include input/output processors and a service processor, the system further including an interrupt bus for interconnecting various elements of the system.

Referring now to FIG. 1 there is illustrated a computer system 10 which includes a computer 12, a communication bus 14, an interrupt bus 16 and a plurality of peripheral units including input/output processors 18 and 20 and a service processor 22. The combination of communication bus 14 and the interrupt bus 16 comprises an input/output bus for the computer system 10.

The computer 12 includes a memory control unit 24 which is connected to both of the buses 14 and 16. A memory array unit 26 is connected to transfer data through a memory bus 28 to and from the memory control unit 24. A central processor unit 30 is connected through a communication bus 32 to the memory control unit 24.

Within the memory control unit 24 there is included a communication bus arbiter 38 and an interrupt bus arbiter 40. Each of the peripheral units, such as processors 18, 20 and 22 is connected to the arbiter 38 by both a request and a grant line. Processor 18 is connected to arbiter 38 through a request line 42 and a grant line 44. The processor 20 is connected to the arbiter 38 through a request line 46 and a grant line 48. The processor 22 is connected to the arbiter 38 through a request line 50 and a grant line 52. The request lines transfer signals from the peripheral unit processor to the arbiter 38 while the grant lines transfer a grant signal from the arbiter 38 to each of the individual processors.

Additional request and grant lines 54 and 56 are provided for any additional peripheral units which are connected to transfer data to and from the memory control unit 24.

An address/data bus 58 provides a plurality of paths for data transfer. The bus 58 is connected in parallel to the memory control unit 24 and the processors 18, 20 and 22. Bus 58 is preferably a 64 bit wide data path which provides bidirectional transfer of data. Additional processors can be connected to the bus 58 with each additional processor also having a corresponding request and grant line connected to the bus arbiter 38. A data handshake line 60 provides a plurality of contral lines connecting the memory control unit 24 and the various processors. The data handshake lines provide conventional signals to permit the transfer of data between the processors and the memory control unit.

The communication bus 14 comprises the collection of lines and buses 42–60.

The interrupt bus 16 comprises a plurality of lines. Interrupt vector lines 66 are a group of 8 parallel lines which provide a bidirectional parallel transfer of an 8bit vector signal which corresponds to one of the units connected to the lines 66. The lines 66 are connected to the central processing unit 30, the interrupt bus arbiter 40 and to the processors 18, 20 and 22. It is further connected to any other peripheral unit on the bus 14. Each of the units on the interrupt bus 16 has a corresponding pair of request and grant lines which are connected to the arbiter 40. Processor 18 is connected to the arbiter 40 through a request line 68 and a grant line 70. The processor 20 is connected to the arbiter 40 through a request line 72 and a grant line 74. The service processor 22 is connected to the interrupt bus arbiter 40 through a request line 76 and a grant line 78. The central processing unit 30 is also connected to the arbiter 40 through a request line 80 and a grant line 82. Each of the units on the interrupt bus 16 is further connected through a common group of interrupt handshake lines 84 for providing control of the transmission of interrupt vector signals through the interrupt bus 16.

Further referring to FIG. 1, the combination of the communication bus 14 and the interrupt bus 16 comprises the overall input/output bus for the computer system 10. Various processors are added to the input/output bus as required for particular implementation. The input/output bus serves as the only path for input/output traffic for the system 10. The buses 14 and 16 are synchronous in operating at the clock cycle of the computer system 10. The various processors 18, 20 and 22, connected to the communication bus 14, function as masters of the bus while the memory control unit 24 is the slave. A transfer request is initiated by a processor, such as for example, processor 18, by generating a request signal that is transmitted through line 42 to the arbiter 38. When the bus 14 becomes available, the arbiter 38 provides a grant signal through line 44 back to the processor 18. The processor 18 then sends a header parcel, further described below, through the bus 58 to the memory control unit 24. Following transmittal of this header parcel, data is transmitted as data parcels through the bus 58. The data transfer can be either from the processor 18 to the memory control unit 24 or from the memory control unit 24 to the input/output processor 18. In any case the data being transferred ultimately starts or ends at the memory array 26. Data communication operation for the computer system 10 is described in further detail below.

Further referring to FIG. 1, the interrupt bus 16 provides a means of communication between the various processors 18, 20 and 22 and the central processing unit 30. Interrupt requests can be transmitted from any one of these units to any other one of the units. The primary function of the interrupt requests are to signal completion of a task, request action or to indicate an error condition. Briefly, the interrupt bus 16 functions much like the communication bus 14 described above. A peripheral unit, such as processor 18, initiates the interrupt procedure by transmitting a request signal through its request line 68 to the interrupt bus arbiter 40. When the arbiter 40 determines that the interrupt bus 16 is available, it provides a grant signal through the line 70 to the processor 18. Upon receipt of the grant, the processor 18 places an interrupt vector, an eight bit code, on the interrupt vector lines 66. This interrupt vector signal is transmitted to all of the other units on the interrupt bus 16. However, only one of the units will recognize the vector as being directed to that particular unit. The receiving unit will acknowledge receipt of the vector and then complete the required interrupt operation. The required interfacing operations between the transmitting and receiving units is controlled by signals transmitted through the handshake lines 84. The interrupt operation for computer system 10 is described below in further detail.

Figure 2:
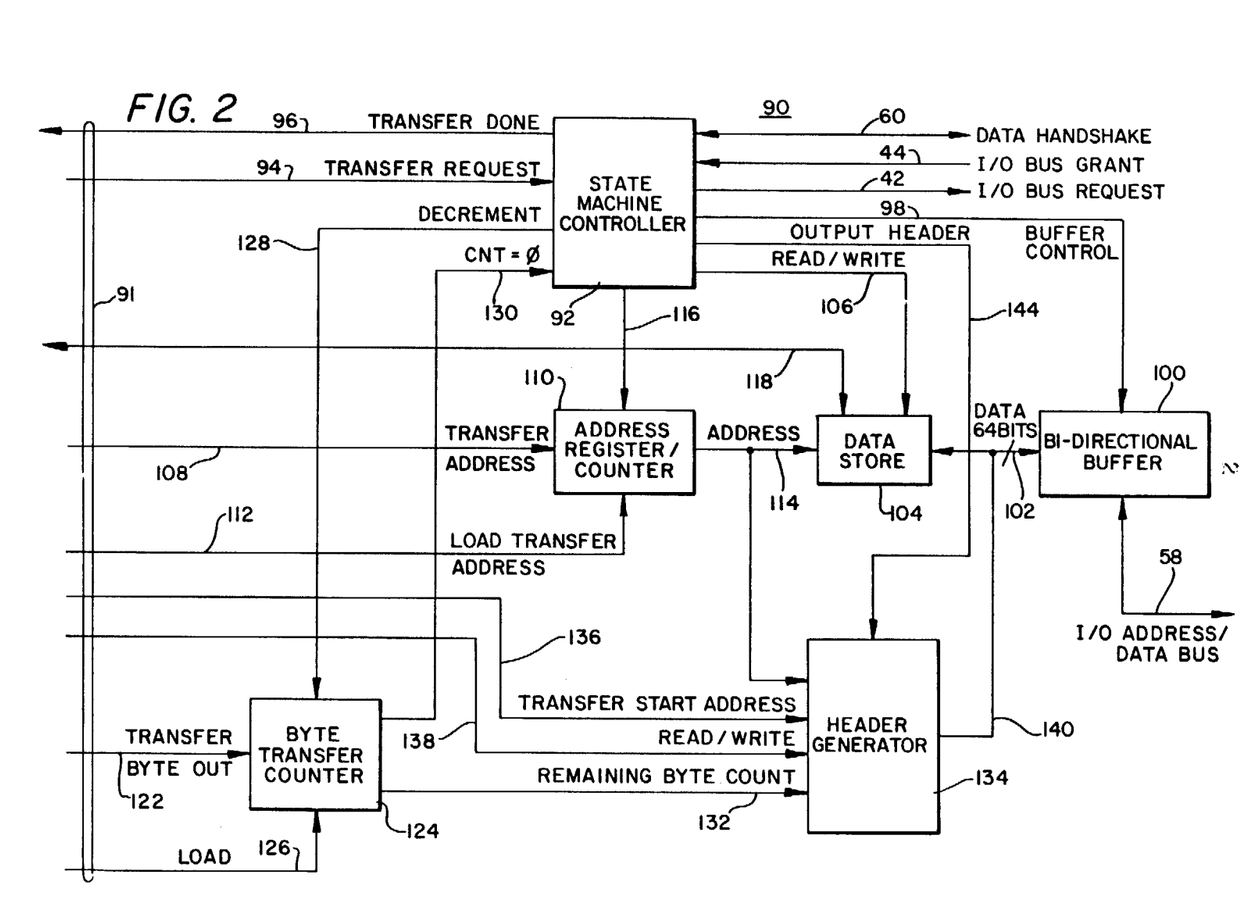
FIG. 2 is a functional block diagram of an input/output bus interface for a peripheral unit such as an input/output processor as shown in FIG. 1.

Referring now to FIG. 2 there is illustrated a typical interface circuit 90 for interfacing a peripheral unit, such as one of the processors 18, 20 and 22 to the communication bus 14. The interface circuit 90 includes a state machine controller 92 which generates control signals in response to various inputs. The controller 92 is connected to the data handshake line 60, the I/O bus grant line 44 and the request line 42. For the present example the interface circuit 90 is used within the input/output processor 18, however, a similar interface circuit is used with each of the other processors shown in FIG. 1. A group 91 of interface lines connects the interface circuit 90 to other sections of the processor 18. In operation, the state machine controller 92 receives a data transfer request via a line 94 from the processor 18. When a data transfer is completed, a transfer done command is transmitted to the processor 18 via a line 96.

The controller 92 is further connected through a line 98 to control the operation of a buffer 100. The buffer 100 provides bidirectional data transfer between the address/data bus 58 and an internal data bus 102. The buffer 100, for the described embodiment, stores a longword of data which is 64 bits.

The interface circuit 90 further includes a data store 104 which is connected to transmit to or receive data from the bus 102. A read or write command is transmitted from the controller 92 through a line 106 connected to the data store 104.

The processor 18 provides a data transfer address through a line 108 to an address register/counter 110. A load transfer address command is generated by the processor 18 and transmitted through a line 112 to the address register counter 110. The counter 110 receives an initial address and adds a constant number to this address to produce a sequence of addresses which are transmitted through a line 114 to the data store 104. The first address and any subsequent address can be selected by the controller 92 through a line 116. Data is transferred between the processor 18 and the data store 104 through a bus 118.

The processor 18, in preparing a transfer request, produces a count of the number of bytes in the data block for the transfer request. This count of the size of the block to be transferred is provided as a transfer byte out count through a line 122 to a byte transfer counter 124. The count is entered into the counter 124 through a load command transmitted through a line 126. The controller 92 monitors each transfer of data through the bus 58. As each group of bytes comprising a data parcel is transferred, the counter 124 is decremented by that number of bytes by of a command transmitted through a decrement line 128 from the controller 92 to the counter 124. The transfer of data is completed when the count within counter 124 equals 0. A count = signal is then transmitted from counter 124 through a line 130 to the controller 92 to signal the completion of the data transaction.

A remaining byte count, the count within the counter 124, can be transmitted through a line 132 to a header generator 134 when a full transaction is not completed. The processor 18 further provides a data transfer start address through a line 136 to the header generator 134. In addition the processor 18 provides a command code through a line 138 specifying a read, write or other possible transaction to the header generator 134. After a header parcel, described further below, has been prepared by the header generator 134 and the state machine controller 92 has obtained use of the communication bus 14, the header parcel is transmitted from the header generator 134 through a line 140 onto the internal data bus 102 for transfer through the buffer 100 to the I/O bus 58. The controller 92 provides a command to output the header parcel and this command is transmitted through a line 144 to the header generator 134. The detailed operation of interface circuit 90 is further described below.

The header parcel noted above is shown in further detail in FIG. 3. The header parcel is indicated generally by the reference numeral 146. The parcel 146 includes a physical address field 148 which comprises bits 0–30. The physical address is the starting address for the transaction. A command field 150 comprises bits 40–42 and specifies the type of transaction, such as read or write. There is further included a byte count field 152 which extends to cover bits 48–63. The lower three bits of the byte count field 152 determine the location of the first byte within the first data parcel transmitted in a data transfer. The remaining bit locations within header parcel 146 are reserved.

Figure 4:
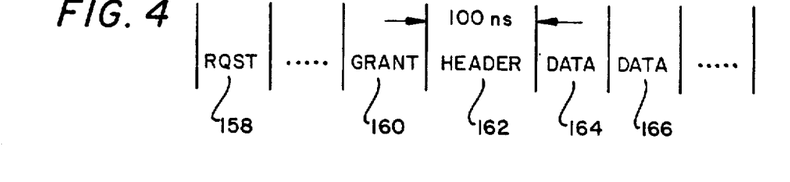
FIG. 4 is a timing illustration showing the sequence of requesting the input/output bus, granting use of the bus, transmitting the header parcel followed by transmission of the sections of data which are termed data parcels.

A timing sequence for obtaining use of the communication bus 14 and transferring data is illustrated in FIG. 4. Each of the time segments comprises a clock tick in which one event is carried out. The first step in a data transfer comprises transmitting a request to the arbiter 38. A request 158 is sent during a clock tick. The arbiter 38 evaluates various factors including the present use of the bus 14 and the other units requesting to use the bus 14. When appropriate, the arbiter 38 provides a grant 160 to the requesting processor. The requesting processor then transmits a preformed header parcel 162 in the clock tick following the grant. Immediately following the header parcel 162 there is a series of data transfers of data parcels 164, 166. . . until the data block is completely transferred or there is an interrupt of the transfer process. In a preferred embodiment of the invention each of the clock ticks has a period of 100 nanoseconds.

Figure 5:
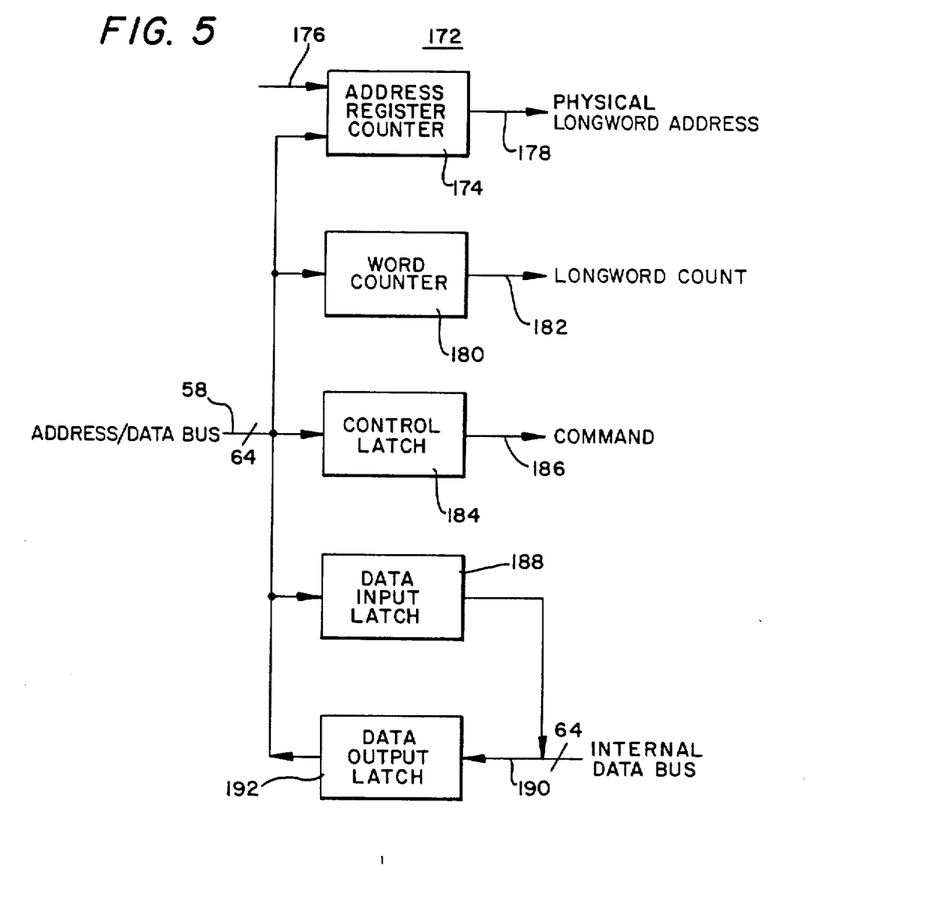
FIG. 5 is a functional block diagram illustrating a circuit for providing transfer of data between the input/output bus and the memory control unit illusrated in FIG. 1.

Referring to FIG. 5 there is shown a memory control unit interface circuit 172 which connects to the communication bus 14 for operating in conjunction with the interface circuit 90 for each of the peripheral units. The circuit 172 includes an address register counter 174 which is connected to receive addresses from the bus 58. The counter 174 further receives an increment command through a line 176 which causes the counter 174 to produce a sequence of physical longword addresses which are transmitted through a line 178 for delivery to the memory array 26. A word counter 180 is connected to the bus 58 for receiving the count which is transmitted as a part of the header parcel 146. The counter 180 transmits a longword count through a line 182 for use by the memory control unit 24. The circuit 172 further includes a control latch 184 which receives the command code that is transmitted as a part of the header parcel 146 through the bus 58. This command is transmitted through a line 186 to the memory control unit 24.

Data received from the bus 58 is input to a data input latch 188 which is connected to transfer the data to a bidirectional internal bus 190. A data output latch 192 is connected to transfer data from the internal data bus 190 to the address/data bus 58.

Figure 3:
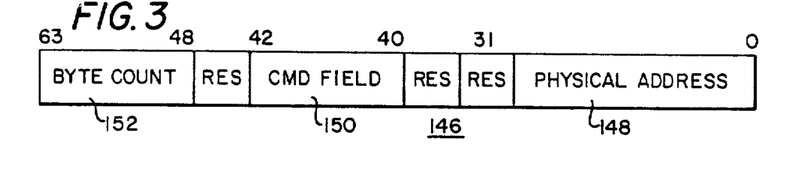
FIG. 3 is an illustration of a header parcel which is generated by one of the peripheral units and transmitted through the input/output processor shown in FIG. 1.

The operation of the communication bus 14 for providing data transfer between the memory control unit 24 and any one of the peripheral units connected to the bus 14 is now described in reference to FIGS. 1–5. A data transfer request is initiated by a peripheral unit, such as one of the processors 18, 20 or 22. Processor 18 is used for the present example. A data transfer can be either from the processor 18 into the memory control unit 24 or from the memory control unit 24 to the input-/output processor 18. The first step in a data transfer is to generate a header parcel as shown in FIG. 3. The processor 18 has a physical address for a data block transfer. This physical address is transmitted through line 108 to the address register counter 110. This address is then transferred through line 114 into the header generator 134 to form field 148 of the header parcel 146. The size, byte count, of the data transfer is transmitted through line 122 to the counter 124. This byte count is transmitted through line 132 into the header generator 134 to comprise the field 152 within the header parcel 146. The command code to determine whether this transfer is a read, write or other operation is transmitted from processor 18 through line 138 into the header generator 134. This command code becomes field 150 within the header parcel 146.

After the header parcel is prepared, the controller 92 initiates a request command through the request line 42 to the arbiter 38. This corresponds to the request 158 shown in FIG. 4. If the bus 14 is not in use then the arbiter 38 immediately provides a grant, such as 160, which is transmitted through line 44 to the controller 92. But if other peripheral units are competing with processor 18 for use of the bus 14, the arbiter 38 must determine which request is the first to receive use of the bus 14. This is primarily done on a round-robin or rotary basis among the similar processors on the bus 14. Basically when there is contention, no processor will receive the bus twice before another processor has received it once. There may further be an allocation of priorities among various units for access to the bus 14. For example, the service processor 22 typically transfers much smaller units of data than the processor 18. Therefore, the processor 22 may be assigned a higher priority for accessing the bus 14.

After the arbiter 38 sends the grant signal to the controller 92, an output header signal is transmitted through line 144 to the header generator 134. This causes the header parcel to be transferred from the generator 134 onto the internal bus 102 to the buffer 100. The controller 92 then activates the buffer 100 to transfer the header parcel onto the address/data bus 58 for transfer to the memory control unit 24. Upon receipt at the interface circuit 172, the various fields in the header parcel are stored in appropriate locations. The physical address is stored in the address register counter 174. The count is stored in the word counter 180. The control code is stored in the control latch 184. The control code that determines whether this a read, write or other operation is transmitted through line 186 to another portion of the memory control unit 24 to activate an appropriate operation, such as read or write with respect to the memory array 26.

First, assume this to be a write operation. The I/O processor 18 has provided data to the data store 104 through line 118. The data store 104 functions as a buffer. A parcel of data, typically a longword, 64 bits, is transferred from the data store 104 to the buffer 100 where it is passed to the bus 58 and then stored in the input latch 188. The data parcel is then passed to the internal data bus 190 where it is stored in the memory array 26 at the address provided by counter 174. Data parcels are sent in a similar fashion during each sequential clock tick, as shown in FIG. 4. During each clock tick the counter 174 is sequenced to form a new address for storing the corresponding data parcel received during the clock tick. This process continues until the decreasing longword count in the word counter 180 reaches 0. This indicates completion of the data transfer.

If the data transfer operation, on the other hand, is a read, the address in the counter 174 is provided to read a block of data from the memory array 26. The data block is returned to the data output latch 192 as a data parcel which is transmitted through the bus 58, to the buffer 100 for storage in the data store 104. When an appropriate size block of data is collected in the data store 104 it is then transmitted through the line 118 to the I/O processor 18. It is then typically stored on a disk or tape. The address in the counter 174 is sequenced to the next memory block to produce the next data parcel for transmission through the data bus 58. This process is repeated until the count within the word counter 180 reaches 0. At this point the read operation is complete.

A typical data transaction between the processor 18 and the memory control unit 24 comprises moving a 4K byte page of data. It is possible that this transaction may be terminated before completion by the arbiter 38 removing the grant signal on line 44. This can occur if a higher priority peripheral unit or the central processor 30 requests use of the bus 14. This does not cause the loss of any data. Upon termination of the transfer, the address for the next data parcel is held in the counter 110 which has been uniformly changed for each transfer of the data parcel. The number of bytes remaining to be transferred is maintained in the counter 124. After the data transfer is broken, the state machine controller 92 starts the process over again to complete the data transfer. A new header parcel is generated in the header generator 134. The address in the counter 110 is transferred via line 114 to the header generator 134 to produce the address portion of the header parcel. The count in counter 124 is transferred to the generator 134 for the data count field of the new header parcel. The command code remains the same. When the controller 92 receives a grant from the arbiter 38 the data transfer process is started again by the transmission of the header parcel through bus 58 to the interface 172. The transfer continues in the same manner as the method described above. This second transmission of the data block can either be carried through to completion or again can be interrupted. Any number of interruptions may occur but the data transfer process can be reinitiated each time to finally provide transfer for the complete data block.

The method of transferring data as described for the present invention provides a significantly greater bandwidth in comparison to previous techniques. This is due to the very small amount of overhead required for a large block transfer, which is the typical case. The only overhead required is for the header parcel. The required addresses at the memory control unit 24 are generated within the unit itself. Breaks in the data transmission are readily handled by maintaining a running address and byte count for the data transfer at the originating unit, such as processor 18. Thus, an interruption in the data transfer process does not result in any loss of data and can be immediately reinitiated in the same fashion as an original transfer. This provides substantial flexibility in input/output communication by permitting the allocation of priorities of operation for various units.

Figure 6:
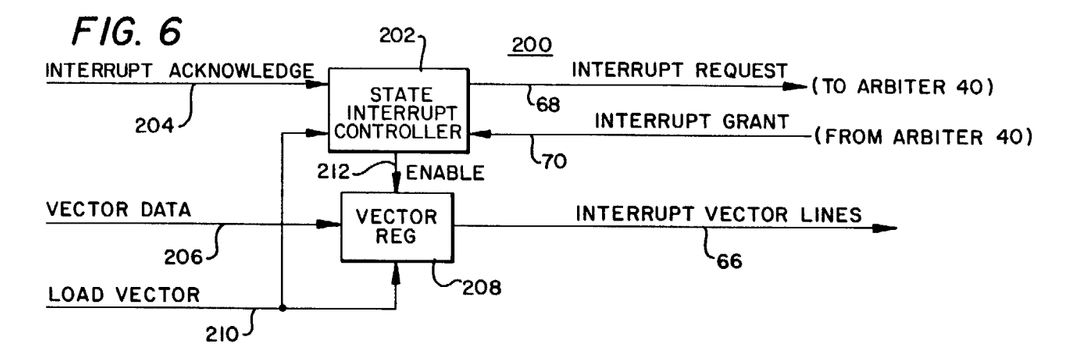
FIG. 6 is an illustration of a sender unit for interfacing with the interrupt bus shown in FIG. 1.
Figure 7:
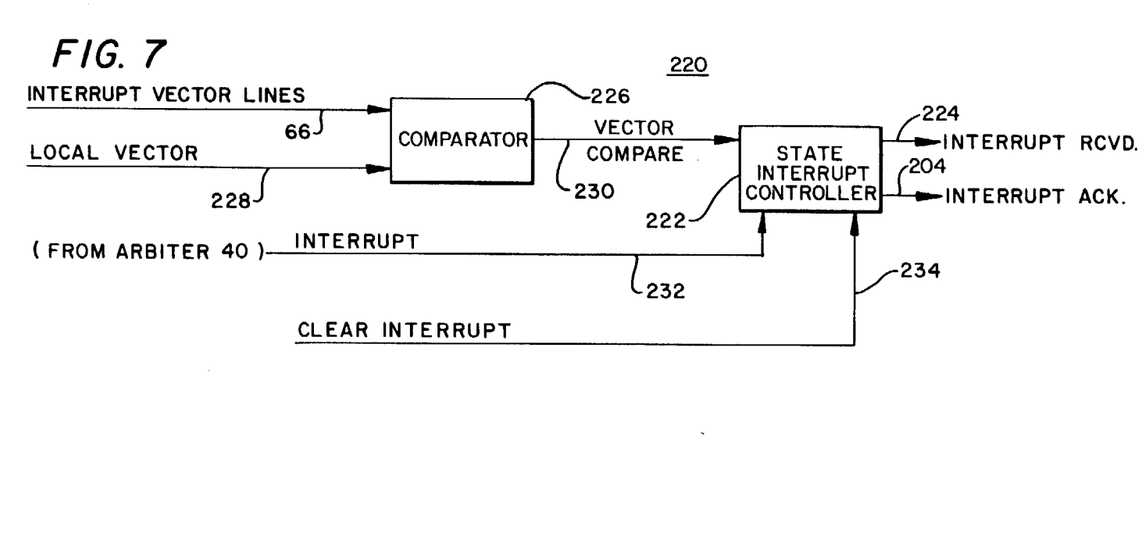
FIG. 7 is a functional block diagram showing a receiver unit for interfacing with the interrupt bus shown in FIG. 1.

The interrupt bus system is now described in reference to FIGS. 6 and 7. FIG. 6 illustrates a sender interface circuit 200 for operation with the interrupt bus 16. Circuit 200 is described in reference to I/O processor 18 as an example. However, a similar sender interface circuit is required for each unit that interfaces to the interrupt bus 16. A state interrupt controller 202 generates a request signal at the request line 68 and receives an interrupt grant signal through the line 70. As a part of the interrupt handshake lines 84 there is included an interrupt acknowledge line 204 which is connected in common to each of the units on the interrupt bus 16. The use of this line is further described in reference to FIG. 7.

Vector data, comprising an 8 bit code, is generated by the processor 18 and transmitted through a line 206 to a vector register 208. The vector data signal transmitted to register 208 identifies a selected element of the computer system that is to receive an interrupt request. The vector data signal is loaded into register 208 in response to a load vector command transmitted through line 210. The vector data signal is transmitted from vector register 208 to the interrupt vector lines 66 in response to an enable signal generated by the controller 202 and transmitted through a line 212 to the register 208.

Referring now to FIG. 7 there is illustrated a receive circuit 220 which forms a part of the interface to the interrupt bus 16 for each of the units connected to the interrupt bus. The circuit 220 includes a state interrupt controller 222 which generates the interrupt acknowledge signal at line 204. The controller 222 further generates an interrupt received signal at a line 224 to activate the interrupt procedure within the processor 18.

The interrupt vector lines 66 are connected to a comparator 226. A local vector signal is input at a line 228 by the processor 18 to identify the vector that is recognized by that particular unit on the interrupt bus 16. The comparator 226 makes a comparison of the interrupt vector signal received at lines 66 with the local vector signal input at line 228 and upon detection of a comparison produces a vector compare signal which is transmitted through a line 230 to the interrupt controller 222. An interrupt line 232 provides an interrupt initiation signal indicating that an interrupt request has been transmitted through the interrupt vector lines 66. This interrupt initiation signal at line 232 is transmitted to the state interrupt controller 222. It serves essentially as an enable to receive the vector compare signal transmitted through line 230. A clear interrupt signal is generated locally by the processor 18 and transmitted through a line 234 to the controller 222. The clear interrupt signal indicates that the function carried out in response to the interrupt request has been completed.

Operation of the interrupt bus is now described in reference to FIGS. 1, 6 and 7. For this description an example will be presented utilizing the I/O processor 18 which includes the interface circuits 200 and 220. The sequence of producing an interrupt request and transmitting it to any one of the other units on the interrupt bus 16 begins with the generation of a vector data signal which is transmitted through line 206 to the vector register 208. State controller 202 applies a request signal to the line 68 for requesting use of the interrupt bus 16. The request signal is received by the interrupt bus arbiter 40 within the memory control unit 24. This arbiter 40 also functions essentially in a round-robin or rotary fashion when there is a conflict in requesting use of the bus 16. As with the arbiter 38, when there is a conflict the basic arbitration rule is that no requestor will have use of the bus twice before one requestor has it once. However, priority may be assigned to certain units to override this rotation scheme.

The arbiter 40 awards the interrupt bus 16 to the requestor by applying a grant signal to the interrupt grant line 70. In response to receipt of the grant the controller 202 applies an enable signal to the register 208 for applying the interrupt vector signal to the lines 66. This vector is then transmitted to each of the other units connected to the interrupt bus 16. However, each vector is recognized by only one unit. But a number of vectors may be transmitted to any one unit to produce different results. The vector signal is input to the comparator 226 for comparison with the local vector signal to determine if the two vectors compare. At the time of making the grant, the arbiter 40 applies a signal to the interrupt line 232 indicating that a valid interrupt vector request has been applied to the vector lines 66. If the interrupt signal at line 232 and the vector compare signal line 230 are received concurrently at the controller 222 there is generated an interrupt acknowledge signal which is transmitted through line 204 to each of the units on the interrupt bus 16. The originating unit, processor 18 in this example, receives the interrupt acknowledge thereby verifying that the interrupt vector has been successfully transmitted and received. The controller 222 further produces an interrupt received signal at line 224 for initiating the processor 18 to carry out the function specified by the interrupt request. During the time that an interrupt function is in process the processor 18 provides an interrupt signal through line 232 indicating that the most recently received interrupt request is in process. This prevents a second interrupt from being received before the first is completed. Upon completion of the received interrupt, the interrupt signal at line 232 is returned to the noninterrupt state to permit receipt of another interrupt.

A particularly significant feature of the present invention is that any unit on the interrupt bus 16 can transmit an interrupt request to any other unit on the interrupt bus 16. There is no requirement to transmit the interrupts to any central location. This adds to the flexibility and speed of operation of the system 10.

In summary, the present invention includes an input-/output bus which includes a communication bus 14 and an interrupt bus 16. The communication bus 14 provides high bandwidth communication between the computer 12 and peripheral units connected to the communication bus 14. By using a header parcel containing the address and other identifying information, the overhead time of the bus 14 is substantially reduced thereby increasing the efficient utilization of the bus. The interrupt bus provides a system whereby any unit on the bus can interrupt any other unit on the bus in a direct interrupt request transfer without the need for processing through a central location.

Although one embodiment of the invention has been illustrated in the accompanying drawings and described in the foregoing detailed description, it will be understood that the invention is not limited to the embodiment disclosed, but is capable of numerous rearrangements, modifications and substitutions of parts and elements without departing from the scope of the invention.

We claim:

1. A method for data communication via a bus connecting a computer to one or more peripheral units, comprising the steps of:

requesting to a bus arbiter for use of said bus by one of said peripheral units, granting use of said bus by said bus arbiter to said one peripheral unit in response to said step of requesting, generating a header parcel by an interface unit for said one peripheral unit, said header parcel comprising an address for a data block to be transferred between said computer and said one peripheral unit, a count indicating the size in units of said data block and a command code indicating whether the data block transfer is a read from or write to said computer, for said data block, transmitting said header parcel form said interface circuit for said one peripheral unit via said bus to said computer after said step of granting, sequentially transmitting units of said data block via said bus between said computer and said peripheral unit, maintaining a count of the number of said units of said data block remaining to be transmitted between said computer and said one peripheral unit, terminating transfer of said data block between said computer and said one peripheral unit prior to the transfer of the entirety of said data block as a result of, for example, preemption of said bus by other of said peripheral units, generating a new header parcel by said interface circuit for said one peripheral unit to complete the transfer of said data block, said new header parcel comprising a new address determined from said address for said data block and said remaining count of the number of units of said data block at the time of the terminating of said transfer of said data block, said remaining count and said command code, and repeating said steps of requesting and granting, transmitting said new header parcel from said interface circuit for said one peripheral unit to said computer, and sequentially transmitting the remaining units of said data block via said bus between said computer and said one peripheral unit.

2. The method recited in claim 1 wherein said step of requesting comprises applying a predetermined logic state by said one peripheral unit to a request line which connects said one peripheral unit to said bus arbiter and said step of granting comprises applying a predetermined logic state to a grant line which connects said bus arbiter to said one peripheral unit.

3. The method as recited in claim 1 wherein said step of sequentially transmitting comprises transmitting said units of said data block from said one peripheral unit to a memory within said computer.

4. The method as recited in claim 1 including the step of generating a sequence of addresses derived from said address included in said header parcel, each sequential address corresponding to one of said units of said data block, each unit of said data block stored in said memory at the corresponding sequential address.

5. The method as recited in claim 1 wherein said step of sequentially transmitting comprises transmitting said units of said data block from a memory in said computer to said one peripheral unit.

6. The method as recited in claim 1 including the step of generating a sequence of addresses derived form said address included in said header parcel, each of said sequential addresses corresponding to a unit of said data block read from said memory.

7. An input/output bus system for providing communication between a computer and one or more peripheral units, comprising:

a plurality of address/data lines connected in parallel to said computer and said peripheral units for bidirectional transmission of addresses and data through said lines, a bus arbiter for granting use of said address/data lines in the absence of a conflict and on a predetermined priority basis when there is a conflict for use of said address/data lines by said computer and peripheral units, a request and grant line respectively for said computer and each of said peripheral units, said request and grant lines connecting the respective computer and peripheral units to said bus arbiter, a plurality of data handshake lines connecting said computer to said peripheral units for verifying transmission of said addresses and data, a plurality of means respectively within each of said peripheral units for generating a header parcel for transmission through said address/data lines to said computer, said header parcel comprising an address for a first one of a plurality of data units which comprise a data block to be transferred between said computer and one of said peripheral units, a count indicating the size of said data block and a command code for indicating a read from or write to said computer, for said data block, means within each of said peripheral units and connected to said address/data lines for transmitting said header parcel from each of said peripheral units via said address/data lines to said computer, means within said computer for generating a sequence of addresses derived from said address included in said header parcel, said sequence of addresses corresponding to said units of said data block, storage means within each of said peripheral units and said computer for storing said data units therein, means within each of said peripheral units and connected to said address data line for transferring said data units of said data block via said address/data lines between the storage means in said computer and the storage means in said peripheral units, means within each of said peripheral units for maintaining a count of the number of the units of said data block transmitting between said computer and said peripheral unit following transmittal of said header parcel, and said means for generating a header parcel includes means connected to receive said count for producing a new header parcel when the transfer of said data block has been terminated before completion, said new header parcel including a new address derived from the address for said data block and said count, said count for indicating the size of the remainder of the data block and said command code, said new header parcel for transmission from the generating peripheral unit to said computer to complete the transfer of said data block.

* * * * *